United States Patent
Aiello et al.

(10) Patent No.: US 6,552,518 B2
(45) Date of Patent: Apr. 22, 2003

(54) CURRENT GENERATOR WITH THERMAL PROTECTION

(75) Inventors: Natale Aiello, Trecastagni (IT); Francesco Macina, Mascalucia (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/876,526

(22) Filed: Jun. 7, 2001

(65) Prior Publication Data

US 2001/0050855 A1 Dec. 13, 2001

(30) Foreign Application Priority Data

Jun. 8, 2000 (EP) .............................. 00830411

(51) Int. Cl.⁷ ................................................ G05F 3/16
(52) U.S. Cl. ........................ 323/315; 323/901; 323/907
(58) Field of Search ................. 323/315, 901, 323/907, 314, 313

(56) References Cited

U.S. PATENT DOCUMENTS

| | | |
|---|---|---|
| 4,344,122 A | 8/1982 | Jones |
| 5,640,317 A | 6/1997 | Lei |
| 5,815,383 A | 9/1998 | Lei |
| 5,821,741 A * | 10/1998 | Brokaw ...................... 323/311 |
| 6,002,244 A * | 12/1999 | Wrathall ...................... 323/315 |
| 6,111,397 A * | 8/2000 | Leung ........................ 323/312 |

FOREIGN PATENT DOCUMENTS

| | | |
|---|---|---|
| EP | 0880086 A1 | 11/1998 |
| WO | WO 95/08862 | 3/1995 |

* cited by examiner

*Primary Examiner*—Shawn Riley
(74) *Attorney, Agent, or Firm*—Lisa K. Jorgenson; Stephen Bongini, Fleit, Kain, Gibbons, Gutman & Bongini P.L.

(57) ABSTRACT

A current generator with thermal protection has an input terminal and an output terminal. The current generator includes a voltage generator, first and second controlled switches, a temperature sensor, and a control circuit. The first controlled switch has a control terminal applied to the voltage generator, a first terminal connected to the input terminal, and a second terminal connected to a resistance. The second controlled switch has a control terminal coupled to the voltage generator, a first terminal connected to the resistance, and a second terminal connected to the output terminal. The temperature sensor of the current generator measures the temperature of the generator, and the control circuit controls the second controlled switch so as to open the second controlled switch when the temperature of the current generator overcomes a preset temperature.

21 Claims, 2 Drawing Sheets

CURRENT GENERATOR WITH THERMAL PROTECTION

BACKGROUND OF THE INVENTION

1. Field of the Invention

The present invention refers to a current generator with thermal protection. Particularly it refers to a generator able to sustain voltages applied to it superior to 400 V. Besides it refers to a power supply of the pulse width modulation type comprising a current generator with thermal protection used as start-up of the power supply.

2. Description of Related Art

In the current generators only one feeding voltage is usually available and no additional feeding voltages are used as they would increase the complexity of the circuit and its cost. Besides, in order that a current generator can be considered as such, the necessary current for its working must be negligible compared to the one supplied. In such a case it becomes problematic to realize a circuit inside that, by measuring the temperature of the current generator, switches it off when the latter exceeds a preset value, as this circuit would make increase the bias current used for the circuits inside the current generator. The difficulty increases when the current supplied by the current generator decreases with the consequence of having to decrease the bias current of the circuits set inside the current generator so that the current generator is as ideal as possible. For instance with a current supplied Iout=1 mA and a bias current Ibias included between 20 and 50 $\mu$A it is almost impossible to realize a circuit able to measure the temperature and to switch off the generator if necessary.

SUMMARY OF THE INVENTION

In view of the described prior art an object of the present invention is that of providing a constant current generator with the varying of the supply voltage having only one supply voltage and a thermal protection circuit which has not got the drawbacks of the known art, and besides a pulse width modulation power supply having a current generator of which above.

In accordance with the present invention, these and other objects are reached by means of a current generator with thermal protection having an input terminal and an output terminal comprising: a voltage generator; a first controlled switch having a control terminal applied to said voltage generator, a first terminal connected to said input terminal, and a second terminal connected to a resistance; characterized by comprising: a second controlled switch having a control terminal coupled to said voltage generator, a first terminal connected to said resistance, and a second terminal connected to said output terminal; a temperature sensor of said current generator able to measure the temperature of said generator; a control circuit of said second controlled switch able to open said second controlled switch in the case in which the temperature of said current generator overcomes a preset temperature.

In accordance with the present invention, such objects are reached also by means of a pulse width modulation power supply comprising a current generator in accordance to claim 1 used as start-up circuit.

BRIEF DESCRIPTION OF THE DRAWINGS

The characteristics and the advantages of the present invention will result evident from the following detailed description of one of its embodiments, illustrated as example not imitative in the joined sketches, in which:

FIG. 3b represents an electric scheme of a variation of the example of current generator with a thermal protection circuit drawn in FIG. 3a;

DETAILED DESCRIPTION OF PREFERRED EMBODIMENTS

Figure 1:
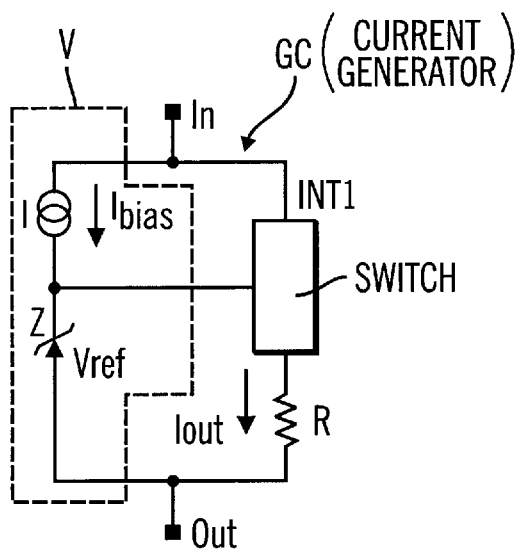
FIG. 1 represents the electric scheme of an example of current generator.

The electric scheme of an example of a current generator GC is represented in FIG. 1, which comprises a voltage generator V having a terminal connected to a terminal IN of the current generator GC, a terminal connected to a terminal OUT of the current generator GC and it supplies a voltage Vref to an output terminal. In FIG. 1 the voltage generator V is constituted by a current generator I that furnishes a current Ibias to a zener diode Z, which furnishes the Vref voltage to the output terminal. Such a voltage generator V can be constituted of other circuits well known to the skilled in the art. The voltage Vref supplied by the voltage generator V is applied to the control terminal of a controlled switch INT1, having a terminal applied to the terminal IN and the other terminal applied to a resistance R in turn connected to the terminal OUT.

The output current of Iout is generated by a constant voltage Vref applied to a resistance R. The controlled switch INT1 has the assignment to sustain all the difference of the potential existing between the terminals IN and OUT, supplying in the same time the current Iout required. So that the current generator GC is efficient, the current Ibias, used for the circuits bias of the current generator GC, must be negligible as regards the output current Iout and besides independent from the applied voltage.

Figure 2:
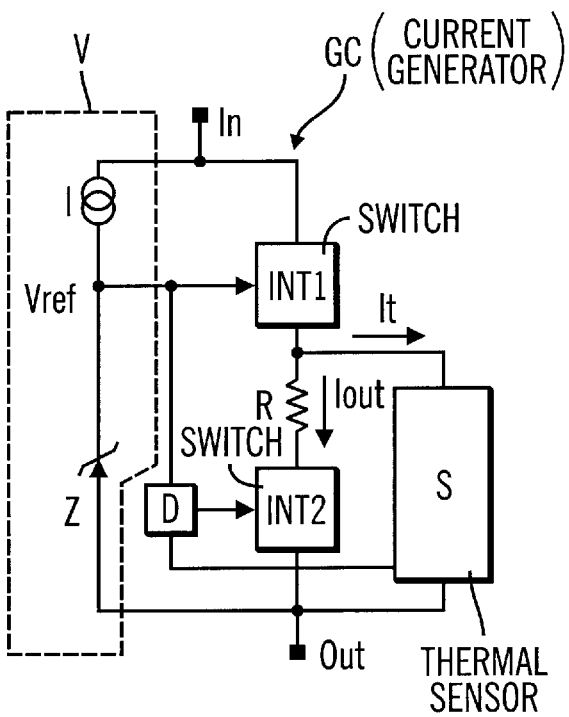
FIG. 2 represents the electric scheme simplified of an example of current generator comprising a thermal protection circuit.

FIG. 2 represents an electric scheme simplified of an example of current generator GC comprising a thermal protection circuit. It comprises, like in FIG. 1, the voltage generator V, the controlled switch INT1 and the resistance R. The resistance R results however connected between a terminal of the controlled switch INT1 and a terminal of a second controlled switch INT2 having a terminal connected to the terminal OUT. Besides it comprises a thermal sensor S able to measure the temperature of the current generator GC, applied between a terminal of the controlled switch INT1 and the output terminal OUT. A voltage proportional to the temperature value is applied to a control circuit D able to determine if the temperature value (voltage) is superior to a preset temperature (voltage) and besides able to open the controlled switch INT2 in case the measured temperature results superior to the preset one and close it at the restoring of the normal conditions. The control circuit D is fed by the voltage Vref.

Figure 3A:
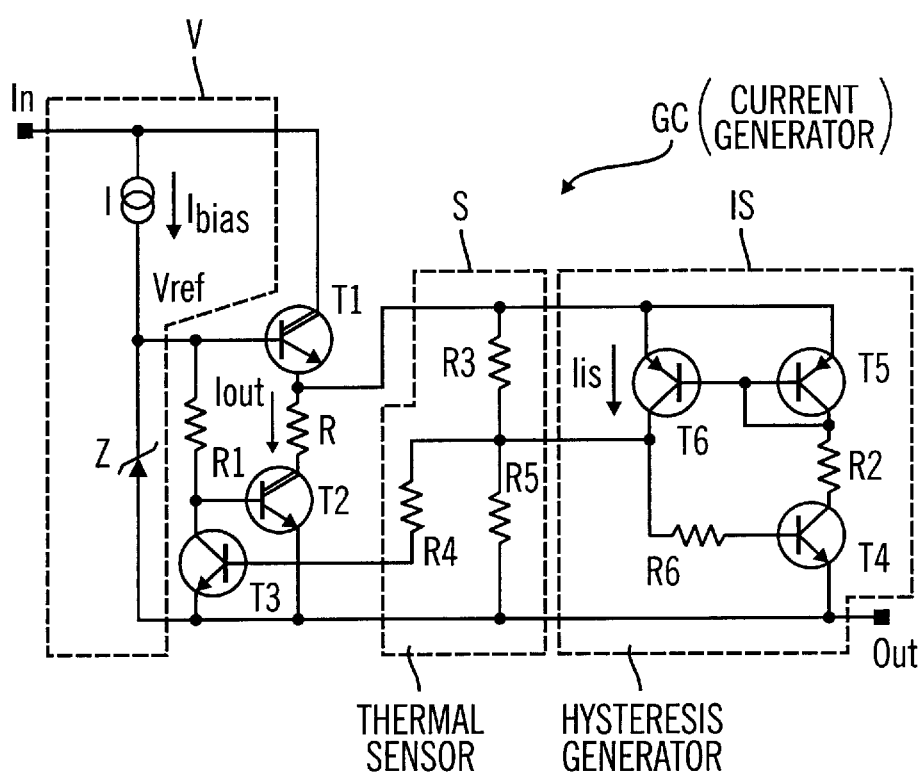
FIG. 3a represents an electric scheme of an example of current generator with a circuit of thermal protection.

In FIG. 3a an electric scheme of an example of current generator GC more detailed compared to that of FIG. 2 is drawn.

It comprises, like in FIG. 2, the voltage generator V and the resistance R. The controlled switches INT1 and INT2 are preferably realized with two transistors T1 and T2 which are to be chosen preferably among the transistors of darlington type so that the current Ibias is as small as possible.

The transistor T1 has the collector, the base and the emitter respectively connected to the terminal IN, to the output terminal of the voltage generator V and to the resistance R.

The transistor T2 has the collector, the base and the emitter respectively connected to the resistance R, to a resistance R1 and to the terminal OUT.

The thermal sensor S comprises a resistance divider R3 and R5 and a transistor T3. The resistances R3 and R5 are applied between the emitter of the transistor T1 and the output terminal OUT, the measured voltage is taken in the connection point of R3 and R5 and applied to the base of a transistor T3, of the thermal sensor S, preferably through a resistance R4. The transistor T3, having the emitter connected to the terminal OUT and the collector connected to the base of the transistor T2, with the voltage divider R3 and R5 perform the function of the circuit S, and besides the transistor T3 performs also the function of the D circuit.

A resistance R1 for the bias of the transistor T2 is connected between the output terminal of the voltage generator V and the base of the transistor T2.

The value of the resistance R1 is selected so as to satisfy the following relationship:

$$R1 = (Vref - 2Vbe)/(Ibias/2)$$

where Vbe is the base emitter voltage of T2.

The voltage generator V is constituted by a current generator I connected by one side to the terminal IN and by the other side to a zener diode Z in turn connected to the terminal OUT. The generator I supply a current Ibias to the zener diode Z, which furnishes the voltage Vref to the output terminal connected to the base of the transistor T1.

Figure 3B:
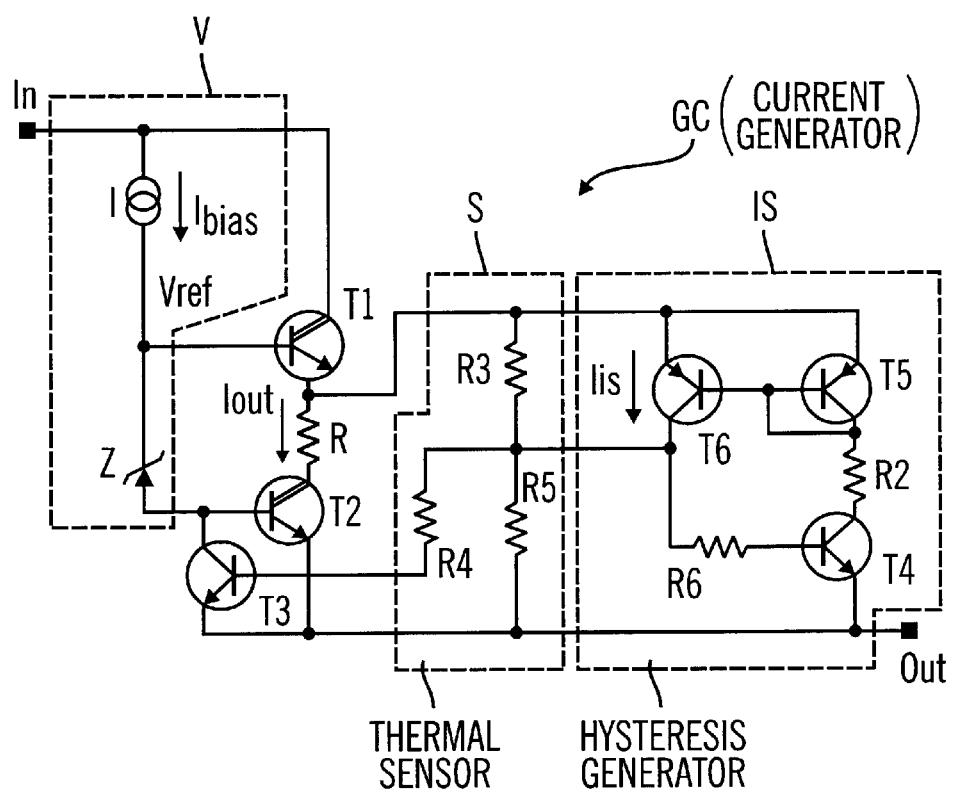

In FIG. 3b an electric scheme of an alternative variation of the example of current generator with a thermal protection circuit reported in FIG. 3a is drawn. As regards FIG. 3a, it has been removed the resistance R1, and the zener diode Z is connected to the base of the transistor T2. In this way it is possible to reduce of an element (the resistance R1) the current generator GC.

In absence of intervention of the thermal protection (T3 switched on), the two transistors T1 and T2 are contemporarily active and the output current Iout is determined by the following relationship:

$$Iout = (Vref - 2Vbe - VceT2)/R$$

where VceT2 is the collector-emitter saturation voltage of the transistor T2.

The value of the temperature at which switching off the current generator is established by when the voltage in the central node of the voltage divider formed by the resistance R3 and R5 and the voltage Vbe of the transistor T3 are equal.

As known the base emitter voltage Vbe of a transistor depends on the junction temperature, in particular it decreases at the increasing of the temperature, when the voltage value of the Vbe of the transistor T3 equals the voltage value in the point of connection of R3 and R5, the transistor T3 enters in conduction. In other words the transistor T3 behaves like a voltage comparator comparing the voltage in the point of connection of R3 and R5 with its Vbe voltage (which depends on the temperature).

Once reached the intervention temperature, the transistor T3 is brought in saturation which lowers the potential of the base of the transistor T2 with the consequent turning off of the same and annulment of the current supplied by the generator Iout. At the decreasing of the temperature, at the achievement of the preset temperature of which above, the emitter base voltage of the transistor T3 will not be any more sufficient to maintain it on and, once switched off, the conditions of normal operation will be reestablished.

To the current generator discussed until now it is preferable to connect an other IS circuit which allows also to generate a thermal hysteresis so that the return to the normal operation conditions will not happen instantly as soon as the temperature results inferior to the preset temperature of turning on (turning off) of the transistor T3, but at a temperature that is inferior to a preset value respect to said preset temperature.

An example of such IS circuit is drawn always in FIGS. 3a and 3b and it comprises a transistor T4 having the base connected to the point of connection of the voltage divider formed by R3 and R5, preferably through a resistance R6. The transistor T4, has the emitter connected to the terminal OUT and the collector connected to a branch of a current mirror, formed by two transistors T5, connected to a diode, and T6, through a resistance R2. Particularly the resistance R2 is connected to the base and to the collector of the transistor T5, the emitter of the transistor T5 is connected to the emitter of the transistor T6 and to the emitter of the transistor T1. The bases of the transistors T5 and T6 are connected together, and the collector of the transistor T6 is connected to the point of connection of the voltage divider formed by R3 and R5.

All the transistors of FIGS. 3a and 3b are of NPN type with exception of T5 and T6 which are of PNP type.

Once reached the intervention temperature, the transistor T3 is carried to saturation, with the consequent turning off of the transistor T2. Contemporarily the same voltage will saturate the transistor T4, which will activate the current mirror formed by T5 and T6 by supplying a current Iis equal to:

$$Iis = (Vref - 3Vbe - VceT4)/R2$$

The current Iis entering in the connection point of the voltage divider formed by R3 and R5 makes the voltage raise, proportional to the temperature of the current generator GC, of a preset value. Therefore the transistor T3 will be able to switch off only when its base emitter voltage Vbe, taken in the point of connection of the voltage divider formed by R3 and R5, will have been reduced not only of the quantity relative to the raising of temperature but also of the quantity owed to the raising of the voltage derived from the current Iis.

To be noted that the transistor T3 switches off only the transistor T2 while the transistor T1 goes on supplying a current that will not equal Iout like previously calculated but it will equal:

$$(Vref - 2Vbe)/(R3+R5) + (1+K)(Vref - 3\ Vbe - VceT4)/R2 = Iout2$$

where K is the relationship between the areas of the transistor T5 and T6, and Iout2 is much smaller than Iout.

The current generator circuit GC in accordance to the present invention has been implemented on silicon so as to form an integrated circuit, particularly suitable to be used englobed in electronic circuits more and more complex.

An interesting application of the current generator GC in accordance to the present invention, is that of the pulse width modulation power supply, particularly to develop the function of start-up of the driver circuit of the power device. An example of an embodiment of a pulse width modulation power comprising a current generator GC in accordance to the present invention is drawn in FIG. 4.

It comprises the current generator GC modified, as described subsequently, having the terminal IN connected to the positive supply Vcc and the terminal OUT connected to a capacitor 42 having the other terminal connected to ground through the transistor 40. The voltage present at the heads of the condenser 42 feeds a driving circuit 43 of a power device 48. The power device 48 is connected to the positive supply Vcc through the primary coil 46 of a transformer 51, the secondary coil 47 of the transformer 51 is connected to a filter 49 and therefore to a load 50. A terminal of a further coil 45 of the transformer 51 is connected to ground, the other terminal, through a diode 44 is connected to the terminal OUT and therefore to the capacitor 42. A further terminal of the driving circuit 43, through a resistance 41, is applied to the base of a transistor 40, having the emitter connected to ground and the collector connected to the output terminal of the voltage generator V of the current generator GC.

In this application the minimum input voltage to which the device begins to supply the current has been raised. A further zener diode is applied in series with the current generator I and particularly it is connected between the generator I and the output terminal of the voltage generator V, so that the generator I supplies the bias current only when overcoming the voltage threshold of the diode zener.

Figure 4:
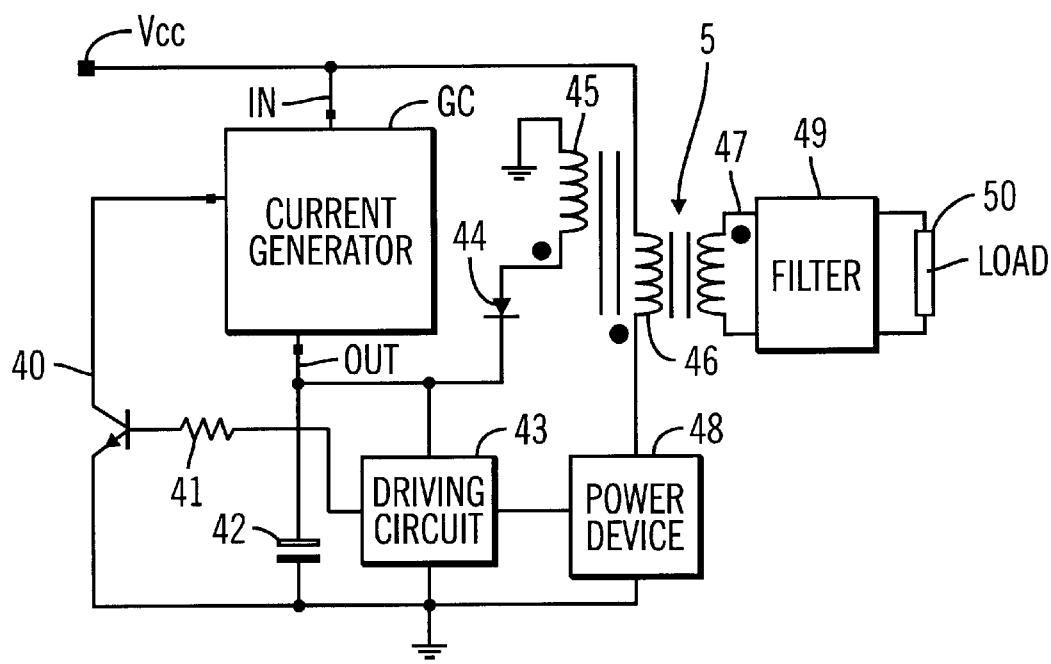
FIG. 4 represents an electric scheme of an example of pulse width modulation power supply comprising a current generator with a thermal protection circuit.

Besides an enabling function has been inserted which allows to switch off the current generator GC once that the driving circuit is turned on, by means of a controlled switch which for instance does not make flow the current Ibias into the zener Z. In FIG. 4 this is constituted by the transistor 40 which sets to ground the output terminal of the voltage generator V.

At the turning on of the power supply and at the overcoming of the voltage threshold of the zener diode in series with the current generator I, the generator GC supplies current to the capacitor 42 and it feeds the driving circuit 43 which puts in operation the whole generator. Once that the generator is at regime the feeding of the driving circuit 43 is supplied to the coil 45 of the transformer 51 and to the diode 44 which maintain the capacitor 42 loaded. The current generator GC is no more necessary and it is therefore turned off by the transistor 40 which sets to ground the output terminal of the voltage generator V of the current generator GC, which missing the Vref voltage is no more able to supply the current Iout.

What is claimed is:

1. Current generator with thermal protection having an input terminal and an output terminal, said current generator comprising:
    a voltage generator;
    a resistance having first and second terminals;
    a first controlled switch having first and second terminals and a control terminal, the control terminal being coupled to said voltage generator, the first terminal being connected to said input terminal, and the second terminal being connected to the first terminal of said resistance;
    a second controlled switch having first and second terminals and a control terminal, the control terminal being coupled to said voltage generator, the first terminal being connected to the second terminal of said resistance, and the second terminal being connected to said output terminal;
    a temperature sensor coupled to said current generator for measuring the temperature of said current generator; and
    a control circuit coupled to said second controlled switch and said temperature sensor, said control circuit opening said second controlled switch when said temperature sensor indicates that the temperature of said current generator is above a preset temperature.

2. Current generator in accordance with claim 1, wherein said temperature sensor comprises a transistor operating as a temperature sensitive element.

3. Current generator in accordance with claim 1, wherein said control circuit comprises a third controlled switch operating as a driver element of said second controlled switch.

4. Current generator in accordance with claim 1, wherein said temperature sensor is coupled between said second terminal of said first controlled switch and said output terminal.

5. Current generator in accordance with claim 4, wherein said temperature sensor comprises a voltage divider connected between said second terminal of said first controlled switch and said output terminal.

6. Current generator with thermal protection having an input terminal and an output terminal, said current generator comprising:
    a voltage generator;
    a first controlled switch having a control terminal applied to said voltage generator, a first terminal connected to said input terminal, and a second terminal connected to a resistance;
    a second controlled switch having a control terminal coupled to said voltage generator, a first terminal connected to said resistance, and a second terminal connected to said output terminal;
    a temperature sensor of said current generator able to measure the temperature of said current generator;
    a control circuit of said second controlled switch able to open said second controlled switch in the case in which the temperature of said current generator overcomes a preset temperature; and
    a third transistor having a control terminal coupled to said second terminal of said first controlled switch, a first terminal connected to said control terminal of said second controlled switch, and a second terminal connected to said output terminal.

7. Current generator in accordance with claim 1, wherein said voltage generator has a first supply terminal, a second supply terminal, and an output terminal, the voltage generator comprising a current generator coupled between said first supply terminal and said output terminal and a voltage reference circuit coupled between said output terminal and said second supply terminal.

8. Current generator in accordance with claim 1, further comprising a hysteresis generating circuit for producing a hysteresis for maintaining said second controlled switch open as long as the temperature of said current generator is inferior to said preset temperature by less than a preset value.

9. Current generator in accordance with claim 8, wherein said hysteresis generating circuit raises a voltage proportionally to the temperature of said current generator.

10. Current generator with thermal protection having an input terminal and an output terminal, said current generator comprising:
    a voltage generator;
    a first controlled switch having a control terminal applied to said voltage generator, a first terminal connected to said input terminal, and a second terminal connected to a resistance;

a second controlled switch having a control terminal coupled to said voltage generator, a first terminal connected to said resistance, and a second terminal connected to said output terminal;

a temperature sensor of said current generator able to measure the temperature of said current generator;

a control circuit of said second controlled switch able to open said second controlled switch in the case in which the temperature of said current generator overcomes a preset temperature;

a current mirror; and a hysteresis generating circuit comprising a transistor having a control terminal coupled to said temperature sensor, a first terminal connected to a branch of said current mirror, and a second terminal connected to said output terminal, wherein the other branch of said current mirror is coupled to said temperature sensor as to raise a voltage proportionally to the temperature of said current generator.

11. Pulse width modulation power supply comprising:

a current generator used as start-up circuit, said current generator including:

a voltage generator;

a resistance having first and second terminals;

a first controlled switch having first and second terminals and a control terminal, the control terminal being coupled to said voltage generator, the first terminal being connected to said input terminal, and the second terminal being connected to the first terminal of said resistance;

a second controlled switch having first and second terminals and a control terminal, the control terminal being coupled to said voltage generator, the first terminal being connected to the second terminal of said resistance, and the second terminal being connected to said output terminal;

a temperature sensor coupled to said current generator for measuring the temperature of said current generator; and a control circuit coupled to said second controlled switch and said temperature sensor, said control circuit opening said second controlled switch when said temperature sensor indicates that the temperature of said current generator is above a preset temperature.

12. Current generator in accordance with claim 1, wherein said control circuit operates such that, when said temperature sensor indicates that the temperature of said current generator is above the preset temperature, said second controlled switch is opened while said first controlled switch remains closed.

13. Pulse width modulation power supply in accordance with claim 11, wherein said control circuit of said current generator comprises a third controlled switch operating as a driver element of said second controlled switch.

14. Pulse width modulation power supply in accordance with claim 11, wherein said temperature sensor of said current generator is coupled between said second terminal of said first controlled switch and said output terminal.

15. Pulse width modulation power supply in accordance with claim 11, wherein said current generator further includes a third transistor having a control terminal coupled to said second terminal of said first controlled switch, a first terminal connected to said control terminal of said second controlled switch, and a second terminal connected to said output terminal.

16. Pulse width modulation power supply in accordance with claim 11, wherein said current generator further includes:

a current mirror; and a hysteresis generating circuit comprising a transistor having a control terminal coupled to said temperature sensor, a first terminal connected to a branch of said current mirror, and a second terminal connected to said output terminal, wherein the other branch of said current mirror is coupled to said temperature sensor as to raise a voltage proportionally to the temperature of said current generator.

17. An integrated circuit including at least one current generator comprising:

a voltage generator;

a resistance having first and second terminals;

a first controlled switch having first and second terminals and a control terminal, the control terminal being coupled to said voltage generator, the first terminal being connected to said input terminal, and the second terminal being connected to the first terminal of said resistance;

a second controlled switch having first and second terminals and a control terminal, the control terminal being coupled to said voltage generator, the first terminal being connected to the second terminal of said resistance, and the second terminal being connected to said output terminal;

a temperature sensor coupled to said current generator for measuring the temperature of said current generator; and a control circuit coupled to said second controlled switch and said temperature sensor, said control circuit opening said second controlled switch when said temperature sensor indicates that the temperature of said current generator is above a preset temperature.

18. The integrated circuit in accordance with claim 17, wherein said control circuit of said current generator comprises a third controlled switch operating as a driver element of said second controlled switch.

19. The integrated circuit in accordance with claim 17, wherein said temperature sensor of said current generator is coupled between said second terminal of said first controlled switch and said output terminal.

20. The integrated circuit in accordance with claim 17, wherein said current generator further comprises a third transistor having a control terminal coupled to said second terminal of said first controlled switch, a first terminal connected to said control terminal of said second controlled switch, and a second terminal connected to said output terminal.

21. The integrated circuit in accordance with claim 17, wherein said current generator further comprises:

a current mirror; and a hysteresis generating circuit comprising a transistor having a control terminal coupled to said temperature sensor, a first terminal connected to a branch of said current mirror, and a second terminal connected to said output terminal, wherein the other branch of said current mirror is coupled to said temperature sensor as to raise a voltage proportionally to the temperature of said current generator.

* * * * *